United States Patent
Anderson et al.

(10) Patent No.: US 6,495,203 B2
(45) Date of Patent: Dec. 17, 2002

(54) TRANSPARENT SUBSTRATE WITH ANTIREFLECTION COATING

(75) Inventors: Charles-Edward Anderson, Courbevoie (FR); Philippe Macquart, Asnieres (FR)

(73) Assignee: Saint-Gobain Vitrage, Courbevoie (FR)

(*) Notice: Subject to any disclaimer, the term of this patent is extended or adjusted under 35 U.S.C. 154(b) by 0 days.

(21) Appl. No.: 09/916,346

(22) Filed: Jul. 30, 2001

(65) Prior Publication Data

US 2002/0001724 A1 Jan. 3, 2002

Related U.S. Application Data

(63) Continuation of application No. 09/765,592, filed on Jan. 22, 2001, now abandoned, which is a continuation of application No. 09/157,516, filed on Sep. 21, 1998, now Pat. No. 6,238,781, which is a continuation of application No. 08/606,309, filed on Feb. 23, 1996, now Pat. No. 5,891,556.

(30) Foreign Application Priority Data

Feb. 23, 1995  (FR) .............................................. 95 02102

(51) Int. Cl.[7] ........................... B05D 5/06; C23C 14/00; C03C 17/00
(52) U.S. Cl. ............... 427/166; 204/192.1; 204/192.22; 204/192.26; 427/162; 427/164; 427/165; 427/372.2; 427/419.1; 427/419.2; 427/419.3
(58) Field of Search ................................. 427/165, 166, 427/162, 419.1, 419.2, 419.3, 372.2; 204/192.1, 192.22, 192.26

(56) References Cited

U.S. PATENT DOCUMENTS

| | | | |
|---|---|---|---|
| 2,617,741 A | | 11/1952 | Lytle |
| 4,289,816 A | * | 9/1981 | Fogelberg et al. |
| 4,702,955 A | * | 10/1987 | Allfred et al. |
| 4,780,334 A | * | 10/1988 | Ackerman |
| 4,995,893 A | | 2/1991 | Jenkins et al. |
| 5,047,131 A | | 9/1991 | Wolfe et al. |
| 5,073,451 A | | 12/1991 | Lida et al. |
| 5,170,291 A | | 12/1992 | Szczyrbowski et al. |
| 5,183,700 A | | 2/1993 | Austin |
| 5,244,692 A | * | 9/1993 | Zagdoun et al. |
| 5,254,392 A | * | 10/1993 | Burns et al. |
| 5,342,676 A | * | 8/1994 | Zagdoun |
| 5,362,552 A | | 11/1994 | Austin |
| 5,450,238 A | | 9/1995 | Bjornard et al. |
| 5,543,229 A | | 8/1996 | Ohsaki et al. |
| 5,776,603 A | * | 7/1998 | Zagdoun et al. |
| 5,798,142 A | * | 8/1998 | Soubeyrand |
| 5,800,918 A | * | 9/1998 | Chartier et al. |
| 5,891,556 A | | 4/1999 | Anderson et al. |
| 5,952,084 A | | 9/1999 | Anderson et al. |

FOREIGN PATENT DOCUMENTS

| | | |
|---|---|---|
| EP | A-0 263 541 | 4/1988 |
| EP | A-0 544 577 | 6/1993 |
| WO | WO 92/04185 | 3/1992 |

OTHER PUBLICATIONS

CA 101:5913a No date.

* cited by examiner

*Primary Examiner*—Archene Turner
(74) *Attorney, Agent, or Firm*—Oblon, Spivak, McClelland, Maier & Neustadt, P.C.

(57) ABSTRACT

The invention relates to a glass substrate having on at least one of its faces an antireflection coating formed by a stack of thin dielectric material layers having alternately high and low refractive indices. To prevent the modification of the optical properties of the coating in the case where the substrate is subject toga heat treatment such as tempering, bending or annealing, the layer or layers of the stack which are liable to deteriorate on contact with alkali ions such as sodium ions are separated form the substrate by at least one layer forming part of the antireflection coating and forming a "shield" with respect to the diffusion of alkali.

7 Claims, 1 Drawing Sheet

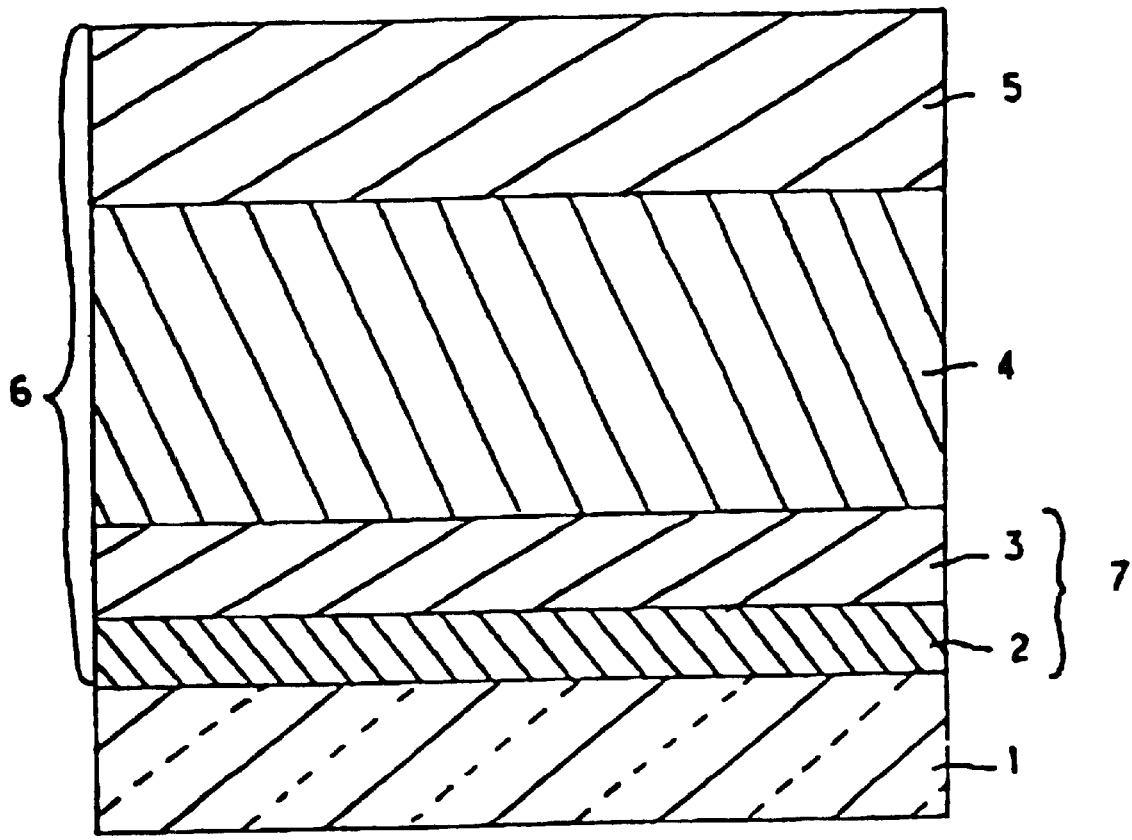

TRANSPARENT SUBSTRATE WITH ANTIREFLECTION COATING

This application is a continuation of application Ser. No. 09/765,592, filed Jan. 22, 2001, abandoned, which is a continuation of application Ser. No. 09/157,516, filed Sep. 21, 1998, U.S. Pat. No. 6,238,781, which is a continuation of application Ser. No. 08/606,309, filed Feb. 23, 1996, U.S. Pat. No. 5,891,556.

BACKGROUND OF THE INVENTION

1. Field of the Invention

The invention relates to transparent and in particular glass substrates, which are provided with an antireflection coating, as well as to their production method. It also relates to the use thereof, particularly as glazings.

2. Discussion of the Background

An antireflection coating is usually formed by a stack of thin interface layers, generally an alternation of low and high refractive index layers. When deposited on a transparent substrate, such a coating has the function of reducing its light reflection, i.e. of increasing its light transmission. Thus, a substrate coated in this way is subject to an increase in its transmitted light to reflected light ratio, which improves the visibility of objects positioned behind it.

An antireflection coating can then be used in numerous applications, e.g. for protecting a panel illuminated by a light placed behind the observer, or for forming or constituting part of a shop display window, so as to make it easier to see what is in the window, even when the internal illumination is weak compared with the external illumination.

The performance characteristics of an antireflection coating can be measured or evaluated on the basis of different criteria. Clearly the fist criteria are of an optical nature. It can be considered that a "good" antireflection coating must be able to lower the light reflection of a standard clear glass substrate to a given value, e.g. 2%, or even 1% and less. It can also be important that the coating ensures that the substrate retains a satisfactory, e.g. neutral calorimetry, very close to that of the bare substrate. Other secondary criteria can be taken into account as a function of the envisaged application, particularly the chemical and/or mechanical durability of the coating, the cost of the materials used or the methods to be used for producing the same.

Patent application WO-92/04185 discloses an antireflection coating deposited on a transparent substrate and constituted by an alternation of layers having a high niobium oxide index and a low silicon oxide index. Its optical performance characteristics are interesting. It is advantageous to use niobium oxide from the industrial standpoint, because it is a material which can be deposited faster than other high index oxides of the titanium oxide type using known vacuum methods, such as reactive cathodic sputtering. However, it is found that such a stack is sensitive to any heat treatment and at high temperature its optical properties are unfavorably modified, particularly with respect to its colorimetry in reflection. This is disadvantageous if it is wished to give the particular substrate already provided with its coating mechanical or esthetic properties which can only be obtained by heat treatments at temperatures which may approach the softening temperature or point of the glass. Such treatment can, e.g., consist of bending or giving the substrate a certain curvature, an annealing for hardening it, or a tempering to prevent injury in the case of shattering.

One object of the invention is to obviate this disadvantage by developing a new type of antireflection, multilayer coating, which has good optical performance characteristics and which retains the latter, no matter whether or not the substrate then undergoes a heat treatment.

SUMMARY OF THE INVENTION

The invention relates to a glass substrate having on at least one of its face an antireflection coating incorporating a stack of thin layers of dielectric materials with alternatively high and low reflective indices. The invention prevents modification to the optical properties of the coating in the case where the substrate is subject to a heat treatment of the tempering, bending or annealing type by ensuring that the layer or layers of the stack which may be subject to deterioration in contact with alkali metal ions, for example of the sodium ion type, emitted by diffusion of the substrate are separated from said substrate by at least one layer forming part of the antireflection coating and which forms a "shield" to the diffusion of the alkali ions.

Thus, it has surprisingly been found that the unfavorable modification of the optical appearance of antireflection coatings under the effect of heat was due to the diffusion of alkali ions from the glass, the ions being inserted in at least some of the layers of the coating thereby structurally modifying these layers leading to a deterioration thereof. The solution according to the invention involves not removing from the antireflection, coating of any material sensitive to the alkali ions, but instead isolating the same from the surface of the glass by means of a shielding layer blocking the alkali diffusion process. This layer is also chosen so as to fulfill, in parallel, an adequate optical function within the antireflection coating. Thus, it is not an additional layer which makes the structure of a conventional antireflection coating more complicated, which is very advantageous from the industrial standpoint.

Thus, these shielding layers make it possible to produce antireflection coatings able to withstand heat treatments without any significant optical modification, while incorporating materials sensitive to alkali, but offering many other advantages.

BRIEF DESCRIPTION OF THE DRAWING

FIG. 1 shows one embodiment of the antireflection stack of the present invention in section.

DETAILED DESCRIPTION OF THE PREFERRED EMBODIMENTS

Thus, the antireflection coatings according to the invention preferably incorporate niobium oxide layers as the high refractive index layers (refractive index approximately 2.30), but placed in the coating so as not to be in contact with the alkali ions of the glass. Niobium oxide ($Nb_2O_5$) is an interesting material which, as stated hereinbefore, can be relatively easily deposited by reactive cathodic sputtering, which has a sufficiently high refractive index and, in particular, a satisfactory mechanical durability.

The antireflection coatings according to the invention may also comprise layers of alkali-sensitive materials other than niobium oxide. It is in fact possible to use tungsten oxide, which has a high refractive index (index approximately 2.17), whose optical appearance can be modified by the insertion of sodium ions. This also applies with respect to cerium oxide ($CeO_2$). Bismuth oxide ($Bi_2O_3$) can also be used and has a high index (approximately 2.30 to 2.52), as well as oxides having multiple valencies.

Preferably, the antireflection coatings according to the invention are such that, on the one hand, the low index dielectric material layers have a refractive index between 1.35 and 1.70, preferably between 1.38 and 1.68, and the high index dielectric material layers with a refractive index of at least 1.80 and preferably between 1.80 and 2.60, more preferably between 2.0 and 2.43, e.g. between 2.10 and 2.35. The antireflection effect is only fully obtained if there is a significant refractive index difference between the high and low index layers arranged in alternating manner.

There are several embodiments of the shielding layer according to the invention. In general terms, the closer this layer is to the surface of the glass, the more it will be able to rapidly stop the diffusion of alkali ions through the stack.

Preferably, the shielding layer is one of the low index layers of the stack and in particular the first low index layer, i.e. that closest to the glass. Also preferably, the first layer has an optical thickness between 40 and 70 nm, particularly approximately 45 to 60 nm. It can be constituted by different materials, all of which have a low index and stop the migration of alkalis and which are in particular chosen from among silicon oxide ($SiO_2$), doped aluminum oxide of the $Al_2O_3$:F type or a mixture of these compounds (the term "doping" here means that the fluorine level in the layer is adequate to lower the refractive index of the alumina to values permitting its use as a low index layer).

An antireflection coating usually has as the first layer a high index layer. When the shielding layer is a low index layer, it is consequently important that the high index layer on which it is generally placed is made from a material able to maintain essentially the same characteristics, particularly optical characteristics, following heat treatment. However, although the material of the high index layer must not deteriorate in contact with the alkali ions, it may still undergo a slight crystallographic modification, particularly when this has no harmful repercussions on its optical properties. Materials such as tin oxide ($SnO_2$), which may optionally be doped, zinc oxide (ZnO), tantalum oxide ($Ta_2O_5$) or zirconium oxide ($ZrO_2$) are suitable.

Another embodiment consists of choosing as the shielding layer a high refractive index layer, particularly the first layer in contact with the glass. This also protects all the other layers of the stack against the action of alkali ions. This shielding layer preferably has an optical thickness between 25 and 50 nm and can be chosen from silicon nitride ($Si_3N_4$) or aluminum nitride (AlN), both materials having an index close to 2.0 and which block alkali ions and are inert with respect thereto.

An antireflection coating according to the invention may only comprise two successive sequences of high and low index layers. Thus, four layers may be sufficient to obtain a remarkable antireflection action. In this case, the first sequence must comprise the shielding layer (either a low or a high index layer) and the second sequence comprises tungsten, bismuth or niobium oxide in particular with an optical thickness between 245 and 290 nm, as well as a final, low index layer of the $SiO_2$ type or a mixture of aluminum-silicon oxide, particularly with an optical thickness between 120 and 150 nm.

An example of this configuration is the following stack:
glass/$SnO_2$/$SiO_2$/$Nb_2O_5$/$SiO_2$ or
glass/$SnO_2$/$SiO_2$/$Bi_2O_3$/$SiO_2$ or
Glass/$SnO_2$/$SiO_2$/$WO_3$/$SiO_2$, the $SiO_2$ shielding layer protecting the $Nb_2O_5$ layer which covers it, the $SnO_2$ layer remaining inert to the alkali ions and not deteriorating under the effect of heat. It is obvious that this type of stack can also have six layers, with a third high/low index oxide sequence.

In another configuration, the second sequence of the antireflection stack according to the invention can comprise an overall high index layer. The term "overall" means that there is a superimposing of high index layers, namely two or three layers, where at least one layer is of niobium, tungsten or bismuth oxide. The following stack is an example of this configuration:
glass/$SnO_2$/$SiO_2$/$Bi_2O_3$/$SnO_2$/$Bi_2O_3$/$SiO_2$
or glass/$SnO_2$/$SiO_2$/$Nb_2O_5$/$SnO_2$/$Nb_2O_5$/$SiO_2$.

According to a third embodiment, the shielding layer according to the invention is completely substituted for the first sequence of high and low index layers and has an intermediate refractive index between 1.7 and 1.8. It preferably has an optical thickness between 80 and 120 nm. Such an intermediate layer has an optical effect very similar to that of a high/low index layer sequence and has the advantage of reducing the total number of layers in the stack. It is advantageously based on a mixture of silicon and tin/Silicon and zinc/Silicon and titanium oxide, or can be based on silicon oxynitride. The relative proportion between the different constituents of these materials makes it possible to adjust the refractive index of the layer. Silicon oxynitride ($SiO_xN_y$) is known in the art and can be prepared by reactive cathodic sputtering using a silicon or doped silicon target in the presence of oxygen and nitrogen gas. The relative amounts of oxygen (x) and nitrogen (y) are adjusted by changing the ratio of oxygen gas to nitrogen gas. The specific stoichiometry can be readily selected by one having ordinary skill in this art by varying the oxygen and nitrogen gas ratio.

A stack configuration example using such a shielding layer is as follows:
glass/$SiO_xN_y$/$Nb_2O_5$/$SiO_2$.

Here again the $SiO_xN_y$ shielding layer protects in an effective manner the $Nb_2O_5$ layer covering it.

No matter which embodiment is chosen, the invention permits the production of glass substrates carrying an antireflection stack having a light reflection $R_L$ of at the most 2%, preferably at the most 1%, the reflection being maintained at 0.5%, or even to within 0.3%, particularly to within 0.2% and even ±0.1% if the glass substrate then undergoes a heat treatment such as bending, tempering, or annealing.

In the same way, the colorimetry in reflection remains virtually unchanged (particularly in the blue or blue-green shades) with, according to the colorimetric system (L*, a*, b*), variations of a* and b* in reflection of at the most 2, particularly at the most 1.5 in absolute values. In overall manner, the best treatments bring about no deterioration of the optical appearance in reflection of this type of antireflection stack, when using as a reference the sensitivity of the human eye.

This leads to a series of advantages, namely a single antireflection coating configuration is sufficient for producing glazings which may or may not be bent and may or may not be tempered.

It becomes unnecessary, on the one hand, to have a type of coating with no alkali-sensitive layers for substrates which undergo heat treatment, and on the other hand, a coating type which can have a type of layer, e.g. of $Nb_2O_5$, for substrates which are not to undergo heat treatment. This facilitates the management of stocks and makes it possible to very rapidly adapt production to treated or untreated glazings, as required, without having to worry about the antireflection coating type.

Another advantage is that it is possible to assemble in random manner on a building facade, e.g. in a display window, glazings having antireflection coatings, certain of which are and certain of which are not heat treated. The eye is unable to detect the disparity in the overall optical appearance of the glazing assembly.

It also becomes possible to sell non-heat treated coated glazings, leaving it to the purchaser to heat treat them, whilst being able to guarantee a consistency in their optical properties.

Preferably, each of the glass substrate faces is coated with an antireflection stack according to the invention, in order to obtain the maximum antireflection effect.

According to the invention, at least one of the low index layers of the antireflection stack can be based on a silicon-aluminum oxide mixture (optionally fluorinated), particularly the last layer of the stack. Such a mixed oxide layer has in particular a chemical durability which is better than a pure $SiO_2$ layer. The optimum aluminum level in the layer is chosen so as to obtain this improved durability, but without excessively increasing the refractive index of the layer compared with pure silica and so as not to deteriorate the optical properties of the antireflection system, alumina having an index of approximately 1.60 to 1.65 higher than that of $SiO_2$, which is approximately 1.45.

The invention also relates to glazings incorporating coated substrates, no matter whether they are monolithic, laminated or multiple with interposed gas layers.

These glazings can be used both as internal and external building glazings, and as protective glass for objects such as panels, display windows, glass furniture such as a counter, a refrigerated display case, etc. also as car glazings such as laminated windshields, mirrors, antiglare screens for computers and decorative glass.

The glazing incorporating the antireflection coating substrate according to the invention may have interesting additional properties. Thus, it can be a glazing having a security function, such as the laminated glazings marketed by SAINT-GOBAIN VITRAGE under the name STADIP, or tempered glazings such as those marked by SAINT-GOBAIN VITRAGE under the name SAKURIT. They can also be burglarproof glazings, such as those marketed by SAINT-GOBAIN VITRAGE under the name CONTRARISC, or soundproofing glazings such as those marketed by SAINT-GOBAIN VITRAGE under the name CONTRASONOR (double glazings) or PHONIN (laminated glazings) or also as fire protection glazings (fire-screen or fire-proof).

The glazing can also be chosen in such a way that on the substrate, already provided with the antireflection stack, or with other glazing-forming substrates on one of its faces, is deposited a layer (or a stack of layers) having a specific function, e.g., sun-shielding or heat-absorbing, such as titanium nitride layers, or layers such as those marketed under the name COOL-LITE or ANTELIO or COOL-LITE K by SAINT-GOBAIN VITRAGE, or also having an anti-ultraviolet, antistatic (such as slightly conductive, doped metallic oxide layer) and low-emissive, such as silver-based layers of the PLANITHERM type or doped tin oxide layers of the EKO type marketed by SAINT-GOBAIN VITRAGE. In the case of an antistatic function layer, it is preferable for the latter to be placed on the substrate face provided with the antireflection stack. The layer can also be of the heating type (metal layer with adequate current leads), which can be of interest for refrigerated display cases, for preventing the deposition of mist on their surface. It can also be a layer having anti-soiling properties such as a very fine $TiO_2$ layer, or a hydrophobic organic layer with a water-repellent function or hydrophilic layer with an anti-mist function. An example of a hydrophobic layer is the fluorinated organosilane-based layer described in U.S. Pat. No. 5,366,892 and U.S. Pat. No. 5,389,427 incorporated herein by reference.

The layer can be a silver coating having a mirror function and all configurations are possible. Thus, in the case of a monolithic glazing with a mirror function, it is of interest to deposit the antireflection coating on face 1 (i.e., on the side where the spectator is positioned) and the silver coating on face 2 (i.e., on the side where the mirror is attached to a wall), the antireflection stack according to the invention thus preventing the splitting of the reflected image.

In the case of a double glazing (where according to convention the faces of glass substrates are numbered starting with the outermost face), it is thus possible to place the antireflection stack on face 1 and the other functional layers on face 2 for anti-ultraviolet or sun-shielding and 3 for low-emissive layers. In a double glazing, it is thus possible to have at least one antireflection stack on one of the faces of the substrates and at least one layer or a stack of layers providing a supplementary functionality. The double glazing can also have several antireflection coatings, particularly at least on faces 2 or 3. For a monolithic glazing 1 it is possible to deposit an antistatic function layer, associated with a second antireflection stack.

In the same way, the glass chosen for the substrate covered with the stack according to the invention or for other substrates associated therewith for forming a glazing can in particular be, for example, extra-clear of the PLANILUX type or tinted of the PARSOL type, both these products being marketed by SAINT-GOBAIN VITRAGE. The glass can itself have a filtering function with respect to ultra-violet radiation. The substrate or substrates can undergo heat treatments, which the antireflection stack according to the invention is able to withstand, such as tempering, bending or even folding, i.e., a bending action with a very small radius of curvature (application to shop counters).

The substrate may also undergo a surface treatment, particularly a grinding (frosting), the antireflection stack being depositable on the ground face or on the opposite face.

The substrate, or one of those with which it is associated, can also be of the printed, decorative glass type, such as ALBARINO, marketed by SAINT-GOBAIN VITRAGE, or can be screen process printed.

A particularly interesting glazing incorporating the substrate with antireflection coating according to the invention is a glazing having a laminated structure with two glass substrates combined by a polyvinylbutyral (PVB)-type assembly polymer sheet. At least one and preferably both substrates are provided with antireflection coatings according to the invention, preferably on the outer face and in particular with the sequence: antireflection coating/glass/PVB/glass/antireflection coating.

This configuration, particularly with two bent and/or tempered substrates, makes it possible to obtain a car glazing and in particular a windshield of a very advantageous nature. Thus, the standards require care to have windsheilds with a high light transmission of at least 75% in normal incidence. Due to the incorporation of antireflection coatings in a laminated structure of a conventional windshield, the light transmission of the glazing is improved, so that its energy transmission can be slightly reduced, while still remaining within the light transmission standards. Thus, the sun-shielding effect of the windshield can be improved, e.g., by absorption of the glass substrates. The light reflection value of a standard, laminated windshield can be brought from 8% to less than 1%, while decreasing its energy transmission from 1 to 10%, e.g., bypassing it from 85 to 81%.

The invention also relates to a process for the production of glass substrates having an antireflection coating. The process involves depositing the layers in succession using a vacuum process, particularly magnetic field-assisted cathodic sputtering. It is thus possible to deposit oxide layers by reactive sputtering of the metal in question in the presence of oxygen and the nitride layers in the presence of nitrogen.

Another choice involves depositing all or part of the layers of the stack, particularly the first layer or layers, by pyrolysis of appropriate precursors. It can, in fact, be a solid phase pyrolysis using precursors in powder form (e.g., tin dibutyl difluoride for forming tin oxide), e.g., in liquid form by dissolving the precursor or precursors in a solvent, or gaseous form. In the latter case, the precursor is brought into gaseous form. It can be tetraorthosilicate (TEOS) or $SiH_4$ for forming silicon oxide. The pyrolysis may take place directly and continuously on the hot float glass ribbon, the following layers then being subsequently deposited on the already cut glass using a cathodic sputtering method.

The details and advantageous characteristics of the invention will become apparent from the non-limitative examples given hereinafter relative to FIG. 1. The very diagrammatic FIG. 1 shows in section a substrate surmounted by an antireflection stack according to the invention (the proportions between the thickness of the substrate and those of the layers are not shown to facilitate understanding). Thus, each of the faces of the substrate is provided with an identical stack, but only one is shown for reasons of clarity. The use of a coating on each of the substrate faces is provided in all the following examples.

It is pointed out that in these examples, the successive deposits of thin layers take place by magnetic field-assisted reactive cathodic sputtering, but it would also be possible to use any other vacuum process or a pyrolysis process permitting good control of the thicknesses of the layers obtained.

The substrates on which are deposited the antireflection coatings are clear soda-lime-silica glass substrates of the PLANILUX type, with a thickness of 3 to 6 mm and in particular 4 mm.

FIG. 1 shows the glass substrate 1 coated, according to a first embodiment, on its two faces with a four-layer stack 6 consisting of an alternation of high index thin layers 2, 4 and low index thin layers 3, 5. Another embodiment consists of replacing the two layers 2, 3 by an intermediate index layer 7.

Other features of the invention will become apparent in the course of the following descriptions of exemplary embodiments which are given below for illustration of the invention but are not intended to be limiting thereof.

EXAMPLES

Comparative Example

This example uses a four-layer coating consisting of the following sequence:

glass/$Nb_2O_5$/$SiO_2$/$Nb_2O_5$/$SiO_2$.

The two $Nb_2O_5$ layers with a refractive index of approximately 2.3 were obtained by reactive sputtering in the presence of oxygen from niobium targets, the two $SiO_2$ layers of refractive index approximately 1.47 are obtained by reactive sputtering in the presence of oxygen from silicon targets doped with boron or aluminum.

The following Table 1 gives the geometrical thickness in nanometers of each of the layers of the stack, numbered in accordance with FIG. 1.

TABLE 1

| COMPARATIVE EXAMPLE | |
|---|---|
| $Nb_2O_5$ (2) | 12 |
| $SiO_2$ (3) | 38 |
| $Nb_2O_5$ (4) | 120 |
| $SiO_2$ (5) | 87 |

Example 1 According to the Invention

This example uses a four-layer, antireflection coating in accordance with the following sequence:

glass/$SnO_2$/$SiO_2$/$Nb_2O_5$/$SiO_2$.

The last three layers were obtained, as described above and with the same refractive index. The first layer was obtained by reactive cathodic sputtering in the presence of oxygen from a tin target and its index is approximately 2.

The following Table 2 gives, for each of the layers of the stack, numbered in accordance with FIG. 1, the preferred geometrical thickness range in nm, as well as its precise thickness selected from within the range.

TABLE 2

| EXAMPLE 1 ACCORDING TO THE INVENTION | | |
|---|---|---|
| | Preferred range | Thickness |
| $SnO_2$ (2) | 10–30 (15–25) | 19 |
| $SiO_2$ (3) | 25–40 (30–38) | 33 |
| $Nb_2O_5$ (4) | 100–150 (110–130) | 115 |
| $SiO_2$ (5) | 70–100 (80–90) | 88 |

The substrates coated according to the comparative example and example 1 then underwent an annealing treatment consisting of heating for one hour at 550° C.

The following Tables 3 and 4 give, for each of the two substrates, before and after the heat treatment, the following photometric data:

light reflection value $F_L$ in %, according to illuminant $D_{65}$, under normal incidence, values of $a^*_{(R)}$, $b^*_{(R)}$ and $L^*_{(R)}$ in reflection, without units, according to the :colorimetry system (L, a*, b*).

TABLE 3

| COMPARATIVE EXAMPLE | | |
|---|---|---|
| | Before heat treatment | After heat treatment |
| $R_L$ | 0.7 | 0.5 |
| $a^*_{(R)}$ | −2.8 | 3.5 |
| $b^*_{(R)}$ | −0.0 | −2.0 |
| $L^*_{(R)}$ | 6.5 | 5.0 |

TABLE 4

| EXAMPLE 1 ACCORDING TO THE INVENTION | | |
|---|---|---|
| | Before heat treatment | After heat treatment |
| $R_L$ | 0.55 | 0.66 |
| $a^*_{(R)}$ | −6.55 | −7.94 |

TABLE 4-continued

EXAMPLE 1 ACCORDING TO THE INVENTION

|  | Before heat treatment | After heat treatment |
|---|---|---|
| $b^*_{(R)}$ | −0.47 | +0.89 |
| $L^*_{(R)}$ | 4.98 | 5.98 |

In addition, two substrates were taken, each provided on one of their faces with the stack defined in Table 2, with assembly by a standard PVB sheet in order to produce a windshield in accordance with the following sequence:

coating (6)/glass/PVB/glass/coating(6).

Compared with the same sequence, but without the two antireflection coatings (6), the $R_L$ is 0.45 instead of 8.15 (invention) and the energy transmission $I_E$ is 81.5% instead of 85% (invention).

Example 2 According to the Invention

This example uses a three-layer, antireflection coating with the following sequence:

glass/$SiO_xN_y$/$Nb_2O_5$/$SiO_2$.

The last two layers are formed like the $Nb_2O_5$ and $SiO_2$ layers of the preceding examples. The first layer is obtained by reactive cathodic sputter in the presence of an $O_2/N_2$ atmosphere from a boron or aluminum-doped silicon target.

The $SiO_xN_y$ layer has a refractive index of approximately 1.75. Table 5 gives for each of the three layers, their preferred geometrical thickness ranges, as well as their precise thicknesses (nm).

TABLE 5

|  | Preferred range | Thickness |
|---|---|---|
| $SiO_xN_y$(7) | 45–75 (55–65) | 61 |
| $Nb_2O_5$(3) | 90–130 (100–110) | 104 |
| $SiO_2$(4) | 70–100 (80–90) | 86 |

The substrate is able to withstand the same type of heat treatment as that undergone in the preceding examples, without any significant modification of its appearance in reflection.

Example 3 According to the Invention

Like Example 1, this example uses a four-layer, antireflection coating with the following stack:

glass/$SnO_2$/$SiO_2$/$Bi_2O_3$/$SiO_2$.

The bismuth oxide is deposited by reactive cathodic sputtering from a bismuth target.

Table 6 gives for each of the layers their preferred geometrical thickness ranges and their precise geometrical thicknesses in nanometers.

TABLE 6

EXAMPLE 3

|  | Preferred range | Thickness |
|---|---|---|
| $SnO_2$ (2) | 10–30 (15–25) | 21 |
| $SiO_2$ (2) | 20–35 (25–32) | 28 |
| $Bi_2O_3$ (4) | 80–130 (95–115) | 108 |
| $SiO_2$ (5) | 70–110 (80–96) | 86 |

The light reflection $R_L$ of the thus coated substrate is 0.50%. The values of $a^*_{(R)}$ and $b^*_{(R)}$ in reflection are, respectively, approximately −3 and approximately −1.

Example 4 According to the Invention

This example uses a six-layer, antireflection stack. The second high index layer starting from the substrate is, in fact, formed from three oxide layers with an index equal to or higher than 2. The stack is as follows (geometrical thicknesses in nanometers given beneath each of the layers):

glass / $SnO_2$ / $SiO_2$ / $Bi_2O_3$ / $SnO_2$ / $Bi_2O_3$ / $SiO_2$
       20      33      37      42      43      87

The light reflection $R_L$ of the coated substrate is 0.45%. The values of $a^*$ and $b^*$ in reflection are, respectively, approximately −3 and −1.

Example 5 According to the Invention

This example uses a five-layer, antireflection stack, the second high index layer starting from the substrate being constituted by two superimposed oxide layers with an index above 2. The stack is as follows (the same conventions regarding thicknesses as in example 4):

glass / $SnO_2$ / $SiO_2$ / $SnO_2$ / $Bi_2O_3$ / $SiO_2$.
      21      35      36      86      86

The light reflection of the substrate is then 0.60% with values of $a^*$ and $b^*$ in reflection of approximately −3 and −1.

Example 6 According to the Invention

This example uses an antireflection stack with a structure similar to that of Example 5, while reversing the sequence of the two superimposed, high index layers, so that the stack is as follows:

glass / $SnO_2$ / $SiO_2$ / $Bi_2O_3$ / $SnO_2$ / $SiO_2$.
      20      36      83      38      88

The light reflection of the substrate is about 0.50% with values of $a^*$ and $b^*$ in reflection of approximately −3 and −1.

It is pointed out that in examples 4 to 6, the thicknesses of each of the constituent layers of the antireflection stacks have been selected so as to obtain in reflection a colorimetry corresponding to negative values of $a^*$ and $b^*$ and, in absolute values, not too high, which means colors in reflection in the blue-green which are agreeable and not very intense. It is obvious that there is no departure from the scope of the invention when choosing similar stack structures, but with slightly different layer thicknesses, e.g. 10 to 20% thicker or thinner. It is thus possible, by adapting the thicknesses, to adapt the colorimetry in reflection as a function of need.

It must also be stressed that the stacks of examples 3 to 6 are able to withstand, without any significant optical modification, the heat treatment undergone by the stack of example 1.

It should also be noted that it is advantageously possible to replace the last $SiO_2$ layers of the stacks of the examples according to the invention by layers of mixed aluminum-silicon oxide, so as to make the layer harder and in particular more chemically resistant (moisture resistance), which is of interest if the antireflection stack has to be placed on the outer face of a glazing. However, the aluminum level must be controlled, so as not to excessively increase the refractive index of the layer. A level of, for example, 2 to 12 wt. % aluminum, based on the $SiO_2$, is satisfactory.

The following conclusions can be drawn from all these results. It is possible to see from Table 4:

the antireflection coatings according to the invention give the glass substrates very low light reflection values below 1% (to be compared with the light reflection of approximately 8% which these substrates would have without coating), their color in reflection is also very neutral, particularly very :low in the blue-green with respect to example 1, which is a presently sought, aesthetic shade, particularly for glazings for buildings, their optical characteristics undergo little or no modification, when the substrates have undergone a high temperature treatment, this more particularly applying to their appearance in reflection.

Thus, the variation in the value of $R_L$, designated $\Delta R_L$, is of a minimum nature, generally below 0.3% and approximately 0.1%. What is even more important, is that their favorable colorimetry in reflection is maintained. The variation of the factor a*, designated $\Delta a*$, is in absolute values generally below 2.0, particularly 1.36. The variation of the factor b*, designated $\Delta b*$, is of the same order of magnitude. On calculating the value of $\Delta E$ on the basis of the data in Table 4, the value being defined by $\sqrt{\Delta L^2+a^2+b^2}$, i.e. the square root of the sum of the squares of the variations of a* and b* and L*, a value generally below 3 and in particular 2.2 is obtained, this value reaching the sensitivity limits of the human eye, which is unable or just able to distinguish between a substrate having heat treated, antireflection stacks and the same, untreated substrate and in both cases remaining in a blue-green shading.

This is not the case with comparative example 1. On referring to Table 3, it can be seen that the heat treatment significantly modifies the appearance in reflection of the substrate. In the example according to the invention, the blue-green shade is maintained, whereas in the comparative example the color in reflection swings from green to mauve/violet, the latter shade not being aesthetically appreciated. This color change can be seen by an observer. On calculating for this comparative example the value of $\Delta E$, as defined hereinbefore, a value of approximately 7.7 is obtained, which falls within the sensitivity range of the human eye.

The reasons for this appearance change are that the first, niobium oxide layer, i.e. the layer nearest to the glass, suffers the effect of the diffusion of the sodium ions ($Na^+$) at high temperature, a very significant structural modification, being transformed into a mixed compound with sodium and niobium and no longer having the initial oxide properties. The same applies for bismuth or tungsten oxide, tungsten oxide also being known to color highly as a result of the insertion of sodium ions.

Thus, the invention makes it possible to establish a compromise, by retaining in its antireflection stacks oxides of the type $Nb_2O_3$, $WO_3$, $CeO_2$ or $Bi_2O_3$, which are sensitive to alkali ions, but isolating them from the glass by appropriate shielding layers, with a view to producing glazings which can be safely hardened, bent or tempered following the deposition of the stacks.

The French priority document FR 95/02102 filed Feb. 23, 1995 is incorporated herein by reference in its entirety.

Obviously, numerous modifications and variations of the present invention are possible in light of the above teachings. It is therefore to be understood that, within the scope of the appended claims, the invention may be practiced otherwise than as specifically described herein.

What is claimed as new and is desired to be secured by Letters Patent of the United States Is:

1. A process for producing a coated glass, the process comprising depositing a first dielectric material layer on a glass substrate by pyrolysis of dielectric material precursors;

cathodically sputtering a second dielectric material layer on the first dielectric material layer;

forming the coated glass; and heating the coated glass to a temperature at of least 550° C., wherein the coated glass comprises the glass substrate; and an antireflection coating on at least one surface of the substrate, where the coating is a stack of dielectric material layers having alternating high and low refractive indices, and at least one of the layers is a shield layer which prevents diffusion of alkali metal ions from the substrate through the shield layer.

2. The process according to claim 1, wherein after the heating the coated glass has a light reflection $R_L$ of at most 2% and a blue or blue-green color in reflection, with a variation of $R_L$ of at most 0.3%.

3. The process according to claim 1, wherein the coated glass has variations of a* and b* of at most 2.0 after heating.

4. The process according to claim 1, wherein the shield layer is a low refractive index dielectric material layer selected from the group consisting of $SiO_2$, $Al_2O_3$, $Al_2O_3$:F and mixtures thereof; and the coated glass further comprises a high refractive index dielectric material layer between the glass substrate and the shield layer.

5. The process according to claim 1, wherein the shield layer is a high refractive index dielectric material layer; and the shield layer has an optical thickness of 25 nm to 60 nm.

6. The process according to claim 1, wherein the high refractive index dielectric material layer and the shield layer is selected from the group consisting of tin oxide, doped tin oxide, zinc oxide, tantalum oxide and zirconium oxide.

7. The process according to claim 1, wherein the antireflection coating comprises, in order outward from the glass substrate, a high refractive index layer directly on the glass substrate;

a first low refractive index layer, serving as the shield layer, including $SiO_2$ or a mixture of $SiO_2$ and $Al_2O_3$;

a layer including $Nb_2O^5$; and a second low refractive index layer including $SiO_2$ or a mixture of $SiO_2$ and $Al_2O_3$.

* * * * *